No. 741,745. Patented October 20, 1903.

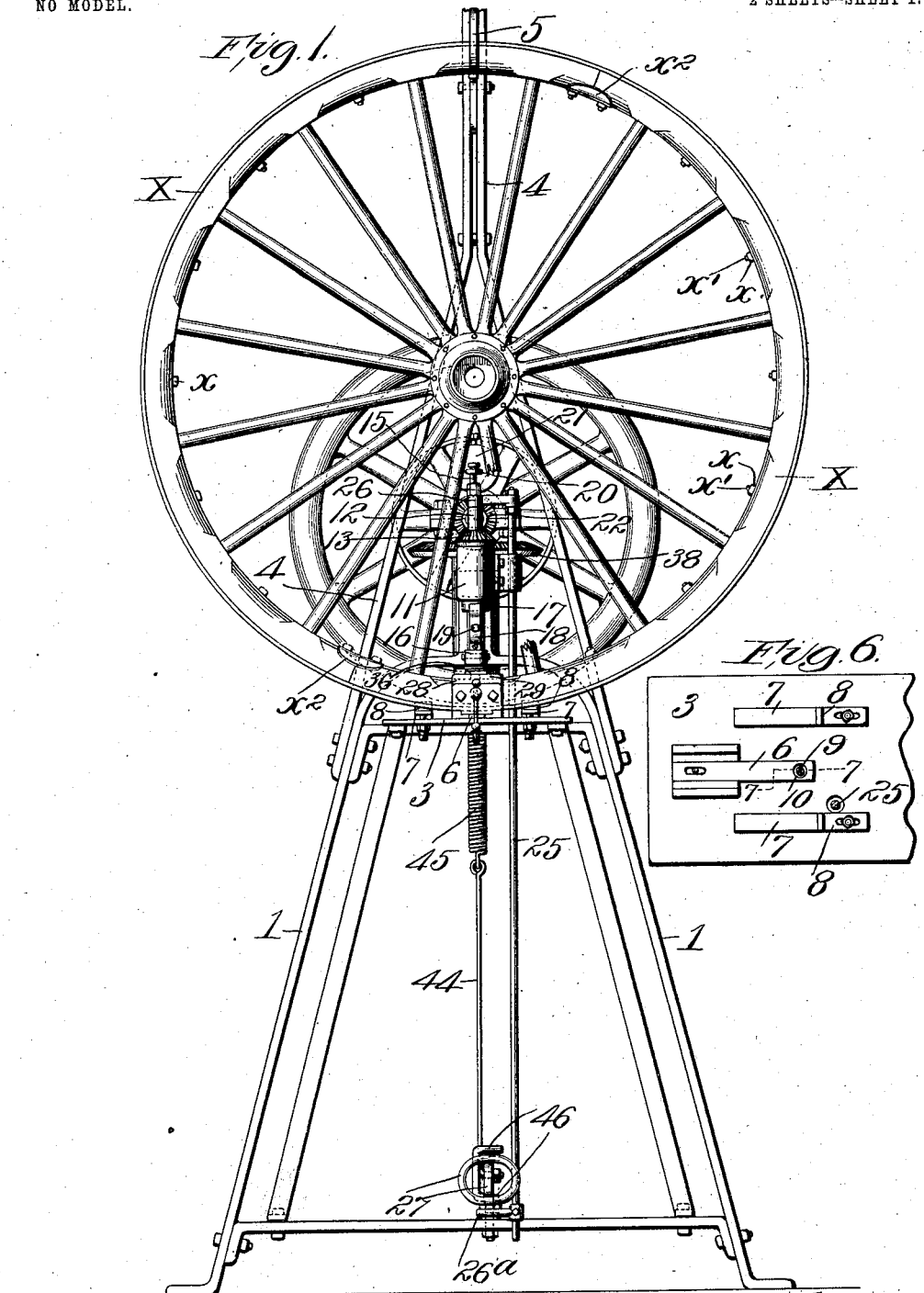

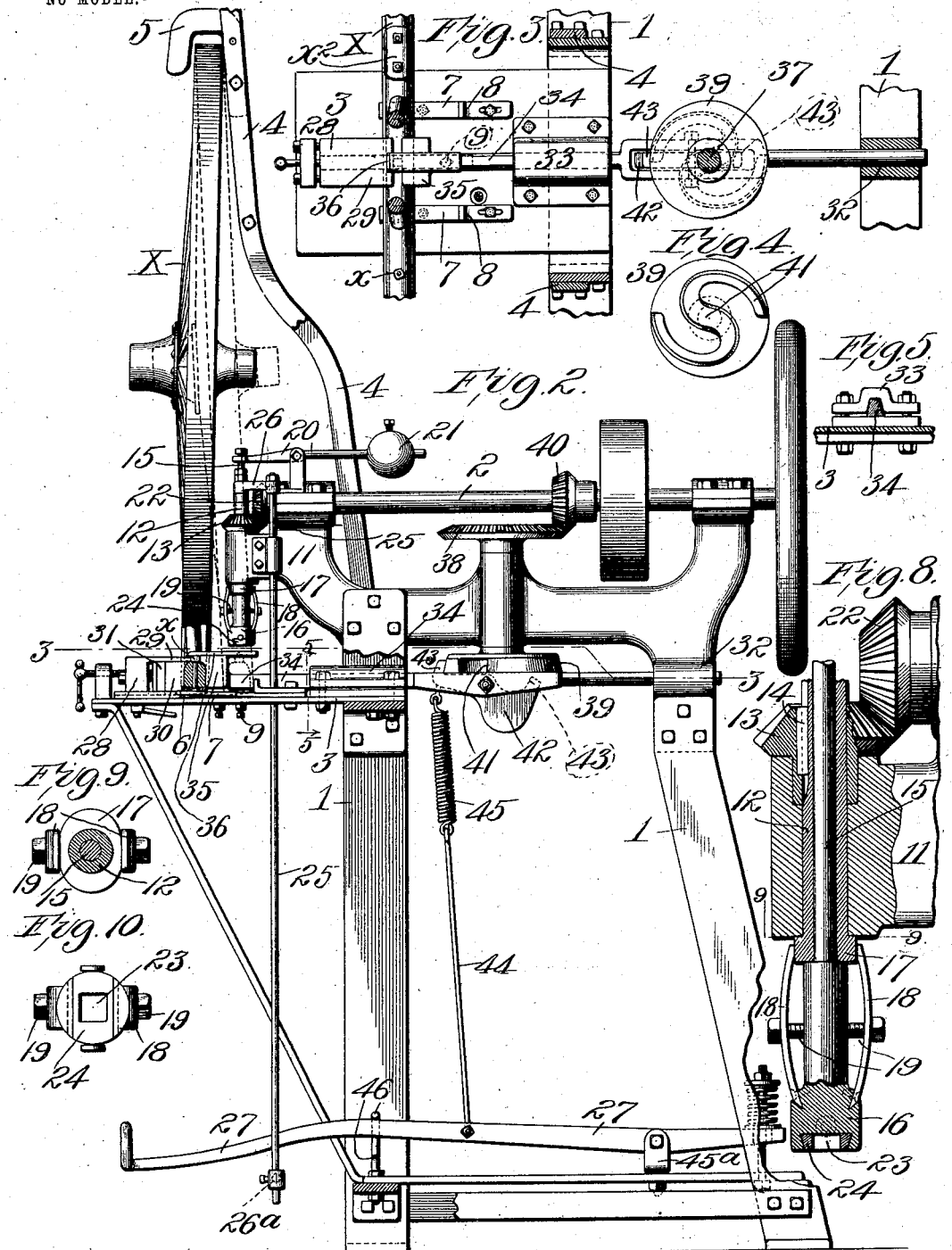

UNITED STATES PATENT OFFICE.

JOSEPH W. WALDORF, OF ST. LOUIS, MISSOURI, ASSIGNOR OF ONE-HALF TO CHARLES C. CRAFT, OF FLORISANT, MISSOURI.

NUT-SETTING AND BOLT-TRIMMING MACHINE.

SPECIFICATION forming part of Letters Patent No. 741,745, dated October 20, 1903.

Application filed March 16, 1903. Serial No. 148,059. (No model.)

*To all whom it may concern:*

Be it known that I, JOSEPH W. WALDORF, a citizen of the United States, residing at St. Louis, Missouri, have invented a certain new and useful Improvement in Nut-Setting and Bolt-Trimming Machines, of which the following is a full, clear, and exact description, such as will enable others skilled in the art to which it appertains to make and use the same, reference being had to the accompanying drawings, forming part of this specification, in which—

Figure 1 is a front view, a wheel being shown in position upon the machine. Fig. 2 is a side elevation. Fig. 3 is a top view, partly in section, on about the line 3 3 of Fig. 2. Fig. 4 is a bottom plan view of the cam-block. Fig. 5 is a detail view on about the line 5 5 of Fig. 2. Fig. 6 is a top plan view of the table for supporting the work. Fig. 7 is a fragmentary detail, partly in section, on about the line 7 7 of Fig. 6. Fig. 8 is an enlarged detail view, chiefly in central sectional elevation, showing the wrench and its operating mechanism. Fig. 9 is a detail view on about the line 9 9 of Fig. 8, and Fig. 10 is a bottom plan view of the wrench-head.

My invention relates to nut-setting and bolt-trimming machines, my object being, primarily, to provide an efficient machine by means of which the nuts can be set or tightened upon the bolts which pass through the rim of a wheel, said machine also being capable of trimming the bolts or cutting off such portions of the bolts as may project beyond the nuts after they have properly set or tightened.

To these ends and also to improve generally upon machines of the character indicated my invention consists in the various matters hereinafter described and claimed.

As is well known, tires are secured to wheel-rims by means of bolts passing through the tire and the rim, the threaded end of the bolt projecting upon the inner side of the rim and the nut being secured upon such threaded end. The portions of the bolts projecting inwardly beyond the nuts are then preferably trimmed or cut off. When the present machine is employed, the bolts are passed through the tire and the rim and the nuts are loosely applied by hand. The wheel is then brought under the operation of the machine, and this machine serves to screw the nuts tightly upon the bolts and to cut off the projecting bolt ends.

In the accompanying drawings, X indicates a wheel, $x$ the nuts, and $x'$ the projecting bolt ends which are to be cut off.

Referring now more particularly to the drawings, 1 represents the supporting-frame of the present machine, a horizontal power-shaft 2 being suitably journaled upon said frame, and 3 represents a supporting-table for the wheel or other work, said table being properly secured to the frame 1 and being below the before-mentioned power-shaft 2. At the front of the machine and extending upwardly from opposite sides of the same are standards 4, between whose upper ends is adjustably secured a hook 5, said hook having its opening above substantially the center of the before-mentioned work-table 3, so that a wheel engaged by said hook rests upon said work-table and can be rotated to bring various parts of its periphery in engagement with the table. Upon the upper side of the work-table are three heavy plate-springs, the central spring projecting inwardly and being marked 6, while the side springs project outwardly and are marked 7. The free ends of these springs extend upwardly away from the work-table and are adapted to support the wheel. The springs 7 are provided with adjustable stops 8, against which the inner side of the wheel-rim is adapted to bear when the wheel is in position to be acted upon by the nut-tightener, as shown by dotted lines in Fig. 2. Adjustably supported in the work-table and projecting above the upper surface thereof is a member 9 for engaging the head of a bolt whose end is being operated upon and holding such bolt against rotation, said member being here shown as a somewhat heavy pin or bolt with its upper end roughened. The roughened engaging end of this holding-pin lies below the upper surface of the supporting-spring 6 when the latter is in elevated position, said spring having an opening 10, through which the engaging end of said holding-pin is adapted to extend.

Suitably journaled in a head 11 of the machine-frame is a vertical sleeve 12, which passes through a suitable opening in a gear 13, journaled in the top of said head, said sleeve and gear being connected by a spline 14 to permit sliding movement of the said sleeve. Passing through the said sleeve is the vertical stem 15 of the wrench-head 16, said sleeve 12 at its lower end fitting against a shoulder formed between the said stem 15 and the body portion of the said wrench, whereby downward movement of said sleeve produces corresponding movement of the wrench. The lower end of the said sleeve is provided with a head 17, which is flattened upon two of its sides, and plate-springs 18 have their lower ends suitably secured to the wrench-head and their upper ends under normal conditions resting against the flattened sides of said head, set-screws 19, which pass through the said springs, being seated in the body portion of the said wrench and serving to adjust the tension upon the springs in a manner which will be apparent. A lever 20, suitably pivoted upon the machine-head, has one end in engagement with the before-mentioned wrench-stem 15 and its other end provided with an adjustable weight 21, so that said wrench is normally held in elevated position and when moved therefrom is returned to such position, upward movement of the wrench serving to correspondingly move the before-mentioned sleeve 12 by reason of the fact that said sleeve rests upon the shoulder formed between the said spindle and the body portion of the wrench. The said gear 13 meshes with a corresponding gear 22 upon the before-mentioned power-shaft 2, so that said shaft being constantly rotated the gear 13, the sleeve 12, and the wrench-head 16 are constantly rotated under normal conditions, the gear 13 driving the sleeve 12 through the spline 14 and the said sleeve in turn driving the wrench through the said springs 18. The socket 23 in the lower face of the wrench-head is adapted to receive the nuts to be tightened and alines with the before-mentioned holding-pin 9. When a wheel is positioned upon the work-table, its lower portion is pushed inwardly until the inner face of the rim engages the before-mentioned stops 8, the supporting-spring 6 permitting the wheel to move smoothly, notwithstanding the fact that the holding-pin 9 projects above the upper surface of the work-table. The wheel being thus positioned with the nut under the wrench-socket 23, the sleeve 12 is depressed, as by means of mechanism to be hereinafter explained, and the wrench receives the nut into its socket, further downward movement of the wrench serving to depress the wheel against the force of its supporting-springs 6 and 7, so that the holding-pin 9 engages the head of the bolt whose nut is to be tightened, and thus prevents rotation of said bolt. The rotating wrench quickly and firmly tightens the nut, and after the nut has been fully tightened the springs 18 yield and permit the sleeve 12 to continue to rotate, while the wrench remains at rest. After the nut has been fully set the operator permits the wrench to be elevated into normal position out of engagement with the nut, whereupon the wheel can be properly manipulated to cause a second nut to be presented to the wrench.

The socket member 24 is preferably detachably connected to the wrench-head in a manner which will be readily apparent, whereby socket members of various kinds can be employed, it being thus possible to provide the machine with socket members having sockets adapted to receive nuts of various sizes. For the purpose of depressing the wrench I have here shown a vertical rod 25, which is suitably guided in its movements through an opening in the work-table and also through a bracket upon the machine-head, the upper end of this rod carrying an arm 26, which is suitably connected to the wrench or the sleeve 12, as by being clamped between the upper end of said sleeve and nuts secured upon the before-mentioned wrench-stem 15. Upon the lower end of said rod is a pin $26^a$, which lies below and is adapted to be engaged by an operating foot-lever 27.

Upon the forward portion of the work-table is a longitudinally-adjustable block 28, from whose upper portion a set-plate 29 extends inwardly, and between said set-plate 29 and the upper surface of the table is a stop-block 30, against which the outer side of the wheel-rim is adapted to bear when the wheel is in outermost position, a cushion-block 31 of some suitable yielding material being preferably interposed between said stop-block 30 and the block or support 28.

Longitudinally slidable in suitable guides, such as the guide 32 upon the machine-frame and the adjustable guide-block 33, connected to the inner end of the work-table, is a horizontal bar 34, whose outer end is provided with a head 35, complementary to the stop-block 30 and the set-plate 29, and mounted upon said head and projecting forwardly therefrom is a cutter 36, which is adapted to shear the projecting bolt ends. Thus as the bar 34 is forced outwardly the nut which has been operated upon by the wrench is engaged between the set-plate 29 and the projecting upper portion of the head 35 and is thus straightened, the knife 36 simultaneously shearing the projecting bolt end at a point just above the nut. Preferably the cutter-plate 36 is extended rearwardly, so that when the head 35 is in forward position the rear extension of said cutter-plate lies below and in the path of movement of the wrench. In this manner it is impossible for the wrench to move into position to obstruct the backward movement of the said bar 34.

Of course many means can be employed for reciprocating the bar 34; but I prefer to employ the mechanism herein illustrated. Suitably journaled upon the machine-frame is a vertical shaft 37, having a horizontal gear 38 upon its upper end and a cam-block 39 upon its lower end, said gear meshing with a coöperating gear 40 upon the before-mentioned horizontal power-shaft 2. The said cam-block is provided with a cam-rib 41, which is generally S-shaped, as shown in Fig. 4. Pivoted in a slot in the bar 34 is a dog 42, which has projections 43 upon opposite sides of the pivot, said projections being adapted to coöperate with the before-mentioned cam-rib 41. One side of said dog is weighted so that its projection 43 farther removed from the work-table is normally in lower position, while the opposite projection is normally in upper position to engage the said cam-rib. A link 44 connects the lighter arm of said dog with the before-mentioned foot-lever 27, a spring 45 being interposed between said link and dog. The foot-lever 27 is pivoted to a bracket 45ª, having swiveled connection with the frame, and said lever is received between upper and lower stop members 46, but can be moved laterally to clear said lower stop member when so desired.

Fig. 2 shows the parts in their normal positions. To insert a wheel, the foot-lever is depressed until it engages the lower stop 46, such movement serving to rock the dog 42 in order to bring the rearmost projection 43 into position to be engaged by the cam-rib upon the constantly-rotating cam-block 39. As will be seen by reference to Fig. 3, the rotation of the cam-block serves to throw the rod 34 backwardly and to thus carry its head backwardly beyond the wrench. The lower stop member 46 arrests the movement of the foot-lever just prior to its engagement with the pin 26 upon the wrench-operating rod 25. The foot-lever being held in depressed position, a wheel is placed in position, as shown by full lines in Fig. 2, and one of the nuts upon the wheel being brought into proper alinement with the wrench-socket and the lower portion of the wheel is forced backwardly until arrested by the stops 8. The foot-lever is then shifted laterally and is further depressed to cause the rotating wrench to move downwardly and tighten the nut, as has been previously explained, the spring 45 permitting such further downward movement of the foot-lever without injury to the dog 42. The nut having been set, the foot-lever is elevated and returned to its normal position, as shown in Fig. 2, such movement permitting the wrench to be restored to elevated position and permitting the dog 42 to fall into normal position, (shown in Fig. 2,) so that the forward projection 43 is brought into position to be engaged by the cam-rib 41 upon the rotating cam-block. The rotation of the cam-block forces the bar 34 outwardly, as will be apparent, the wheel-rim being engaged between the block 30 and the head 35, the nut being straightened between the plate 29 and the projecting upper portion of said head 35 and the cutter 36 shearing the projecting portion of the bolt, as has been previously explained. Upon again depressing the foot-lever the dog 42 is rocked and the bar 34 is moved backwardly, the wheel is partially rotated in order to bring the next nut into position to be acted upon, the lower portion of the wheel is then forced against the guides 8, the foot-lever is shifted laterally and further depressed, and the operations previously described are repeated.

The compressing action between the block 30, the plate 29, and the head 35 serves to properly press the felly-plates $x^2$ against the fellies.

I am aware that minor changes in the construction, arrangement, and combination of the several parts of my device can be made and substituted for those shown and described without in the least departing from the nature and principle of my invention.

Having thus described my invention, what I claim as new, and desire to secure by Letters Patent, is—

1. In a machine of the character indicated, a wrench movable toward and away from the work, a cutter also movable toward and away from the work, means for moving the cutter away from the work and then moving the wrench to the work, and means for then moving said wrench away from the work and moving said cutter to the work; substantially as described.

2. In a machine of the character indicated, a stop for the work, a wrench movable toward and away from the work and adapted to engage the latter when said work is against said stop, a second stop for the work and adapted to be engaged by the same when said work is clear of said wrench, said work being movable between said stops, a head movable toward and away from the work and adapted to engage the side thereof opposite said second-mentioned stop, and a cutter carried by said head; substantially as described.

3. In a machine of the character indicated, a work-table, two stops thereon between which the work is movable, a wrench above said table and movable toward and away from the same, means for operating said wrench, a cutter movable toward and away from the work above said table, and means for reciprocating said cutter; substantially as described.

4. In a machine of the character indicated, a work-table, two stops thereon between which the work is movable, a wrench above said table and movable toward and away from the same, means for operating said wrench, a reciprocatory cutter above said table, means for reciprocating said cutter, a head movable with said cutter, and coöperating nut-straightening members upon said head and one of said stops; substantially as described.

5. In a machine of the character indicated, a wrench movable toward and away from the work, a cutter movable toward and away from the work and moving through the path of movement of said wrench, and means for preventing said wrench from moving into the path of movement of said cutter when the latter is in one of its positions; substantially as described.

6. In a machine of the character indicated, a wrench movable toward and away from the work, and a cutter also movable toward and away from the work and movable across the path of movement of said wrench, said cutter having a portion which projects in the path of movement of said wrench and prevents the same from moving into the path of movement of said cutter when the latter is in one of its positions; substantially as described.

7. In a machine of the character indicated, a vertically-reciprocatory wrench, a horizontally-reciprocatory head movable across the line of movement of said wrench, and a cutter upon said head and having a projecting portion which extends under said wrench when said head is in one of its positions; substantially as described.

8. In a machine of the character indicated, a wrench movable toward and away from the work, a cutter also movable toward and away from the work, a movable member controlling the operation of said wrench and cutter, means whereby the movement of said controlling member is arrested after it is moved sufficiently to cause operation of said cutter and before it has moved sufficiently to cause operation of said wrench, and means whereby said controlling member can then be further moved to cause operation of said wrench; substantially as described.

9. In a machine of the character indicated, a wrench movable toward and away from the work, a cutter also movable toward and away from the work, a movable member controlling the operation of said wrench and said cutter, means whereby movement of said member is arrested after it has moved sufficiently to cause reverse movement of said cutter, means whereby said movable member can be further moved to cause said wrench to approach the work, and means whereby upon reverse movement of said member said wrench is caused to recede from the work and said cutter is moved to engage the work; substantially as described.

10. In a machine of the character indicated, a wrench movable toward and away from the work, a cutter also movable toward and away from the work, a movable member controlling the operation of said wrench and said cutter, means whereby movement of said member is arrested after it has moved sufficiently to cause reverse movement of said cutter, means whereby said movable member can be further moved to cause said wrench to approach the work, and means whereby said cutter is held in retracted position until said wrench has receded from the work; substantially as described.

11. In a machine of the character indicated, a wrench movable toward and away from the work, a cutter also movable toward and away from the work, a movable member coöperating with said cutter and adapted when in one position to cause the cutter to be moved away from the work and, when in another position to cause the cutter to be moved toward the work, an operating-lever, yielding connection between said operating-lever and said cutter-controlling member, and a part connected to said wrench for causing movement of the same toward or away from the work, and adapted to be operatively engaged by said operating-lever; substantially as described.

12. In a machine of the character indicated, a wrench movable toward and away from the work, a cutter also movable toward and away from the work, a movable member coöperating with said cutter and adapted when in one position to cause said cutter to be moved away from the work and when in another position to cause the cutter to be moved toward the work, an operating-lever, means for arresting movement of said lever, means whereby said lever can be further moved after being so arrested, yielding connection between said lever and said cutter-controlling member, and a part connected to said wrench and adapted to be engaged by said lever when the same is moved after having been arrested; substantially as described.

13. In a machine of the character indicated, a wrench movable toward and away from the work, a cutter also movable toward and away from the work, a pivoted dog for controlling the operation of said cutter, an operating-lever, a stop in the path of movement thereof, means whereby said lever can be moved to clear said stop and then be given further operative movement, connection, including a spring, between said lever and said dog, and a rod connected to said wrench and having a projection which lies in the path of movement of said lever and is adapted to be engaged by the same after the lever has been moved to clear said stop; substantially as described.

14. In a machine of the character indicated, a work-table, a standard, and a hook upon said standard and above said table, said hook having its opening upon its lower side, whereby work supported upon said table can be received in said hook; substantially as described.

15. In a machine of the character indicated, a rotatable wrench, a substantially concentric, rotatable driving member, and driving-springs operatively engaging one of said elements and bearing under tension against an engaging surface upon the other thereof; substantially as described.

16. In a machine of the character indicated, a rotatable wrench, a substantially concentric rotatable driving member having a head provided with flattened sides connected by curved portions, and driving-springs connected to said wrench and bearing under tension against said flattened sides of said head; substantially as described.

17. In a machine of the character indicated, a wrench having a stem, a driving-sleeve rotatably mounted upon said stem, means for rotating said sleeve and for permitting the same and said wrench to be moved toward and away from the work, and yielding driving connection between said sleeve and said wrench; substantially as described.

18. In a machine of the character indicated, a wrench having a stem, a driving-sleeve rotatably mounted upon said stem, yielding driving connection between said sleeve and said wrench, said sleeve and wrench being movable toward and away from the work, a rotatable driving member for said sleeve, and sliding connection between said sleeve and its said driving member; substantially as described.

19. In a machine of the character indicated, a head, a driving-sleeve journaled in an opening therethrough, a wrench having a stem upon which said sleeve is rotatable, yielding driving connection between said sleeve and said wrench, a driving-gear upon said sleeve and bearing against said head, and sliding driving connection between said sleeve and said gear; substantially as described.

20. In a machine of the character indicated, a support, a bolt-holding member extending therefrom, and a yielding work-supporting member over said bolt-holding member; substantially as described.

21. In a machine of the character indicated, a work-table, a bolt-holding member projecting therefrom, and a work-supporting spring over said bolt-holding member; substantially as described.

22. In a machine of the character indicated, a work-arresting stop, and a work-supporting spring between which and said stop the work is adapted to be received; substantially as described.

23. In a machine of the character indicated, a reciprocatory element, a driving element therefor, and a movable member connected to said reciprocatory element and coöperating with said driving element, said movable member when in one position causing said reciprocatory element to be moved in one direction and, when in another position, causing said reciprocatory element to be moved in the opposite direction; substantially as described.

24. In a machine of the character indicated, a reciprocatory element, a rotatable driving element therefor provided with two cams adapted to respectively drive said reciprocatory element in opposite directions, and a part movably connected to said reciprocatory element and adapted to be thrown into engagement with either of said cams; substantially as described.

25. In a machine of the character indicated, a reciprocatory element, a rotatable driving member therefor provided with two cams adapted to respectively move said reciprocatory element in opposite directions, and a dog pivoted to said reciprocatory element and having projections adapted to be engaged by said cams; substantially as described.

26. In a machine of the character indicated, a reciprocatory element, a rotatable driving member therefor, an S-shaped cam-rib upon said driving member, and a movable part connected to said reciprocatory element and coöperating with said cam-rib; substantially as described.

In testimony whereof I hereunto affix my signature, in the presence of two witnesses, this 11th day of March, 1903.

JOSEPH W. WALDORF.

Witnesses:
GALES P. MOORE,
GEORGE BAKEWELL.